(12) United States Patent
Bisson (10) Patent No.: US 9,045,089 B1
(45) Date of Patent: Jun. 2, 2015

(54) GLOVE COMPARTMENT

(71) Applicant: NYX, Inc., Livonia, MI (US)

(72) Inventor: Jeffrey Michael Bisson, Amherstburg (CA)

(73) Assignee: NYX, INC., Livonia, MI (US)

( * ) Notice: Subject to any disclaimer, the term of this patent is extended or adjusted under 35 U.S.C. 154(b) by 0 days.

(21) Appl. No.: 14/278,619

(22) Filed: May 15, 2014

(51) Int. Cl.
 *B60R 7/06* (2006.01)
(52) U.S. Cl.
 CPC ........................................ *B60R 7/06* (2013.01)
(58) Field of Classification Search
 CPC ....................................................... B60R 7/06
 USPC ..................... 296/37.12, 37.1, 37.8
 See application file for complete search history.

(56) References Cited

U.S. PATENT DOCUMENTS

| | | | |
|---|---|---|---|
| 3,232,661 A | | 2/1966 | Walsh |
| 3,386,765 A | | 6/1968 | Drach, Jr, |
| 3,503,648 A | | 3/1970 | Edward |
| 4,355,837 A | | 10/1982 | Shimizu et al. |
| 5,273,310 A | * | 12/1993 | Terai ............................ 280/732 |
| 5,397,160 A | * | 3/1995 | Landry ......................... 296/37.8 |
| 5,971,461 A | | 10/1999 | Vaishnav et al. |
| 6,231,099 B1 | * | 5/2001 | Greenwald ................... 296/37.8 |
| 6,715,815 B2 | * | 4/2004 | Toppani ...................... 296/37.12 |
| 6,899,364 B2 | | 5/2005 | Park et al. |
| 6,945,579 B2 | | 9/2005 | Peck, Jr. et al. |
| 7,533,919 B2 | * | 5/2009 | Sauer ......................... 296/37.12 |
| 7,862,096 B2 | * | 1/2011 | Kim et al. .................. 296/37.12 |
| 8,191,935 B2 | | 6/2012 | Toppani et al. |
| 2002/0084666 A1 | | 7/2002 | Toppani |
| 2008/0290682 A1 | | 11/2008 | Sauer |

* cited by examiner

*Primary Examiner* — Pinel Romain
(74) *Attorney, Agent, or Firm* — Carlson, Gaskey & Olds, P.C.

(57) ABSTRACT

A glove compartment for a vehicle includes a carrier that is unitarily formed of a polymeric material. The carrier includes a distinct upper compartment, a distinct lower compartment, and a distinct intermediate compartment that is between the upper compartment and the lower compartment. A first door is mounted on the carrier and is moveable between open and closed positions with respect to the lower and intermediate compartments. A second door is mounted on the carrier and is movable between open and closed positions with respect to the upper compartment. The second door can include first and second hinge arms that extend outwards from a door panel. The hinge arms are received through first and second openings in the upper compartment and are pivotally supported on first and second hinge mounts that are situated outside of the upper compartment.

17 Claims, 6 Drawing Sheets

GLOVE COMPARTMENT

BACKGROUND

This disclosure relates to a storage compartment, also known as a glove compartment, for vehicles. The glove compartment is typically mounted in the dashboard of the vehicle, in front of the passenger seat. Generally, the glove compartment includes an internal storage area and a latched access door.

SUMMARY

A glove compartment according to an example of the present disclosure includes a carrier that is unitarily formed of a polymeric material. The carrier includes a distinct upper compartment, a distinct lower compartment, and a distinct intermediate compartment that is between the upper compartment and the lower compartment. A first door is mounted on the carrier and is moveable between open and closed positions with respect to the lower and intermediate compartments. A second door is mounted on the carrier and is movable between open and closed positions with respect to the upper compartment.

In further examples, the second door can include first and second hinge arms that extend outwards from a door panel. The hinge arms are received through first and second openings in the upper compartment and are pivotally supported on first and second hinge mounts that are situated outside of the upper compartment.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
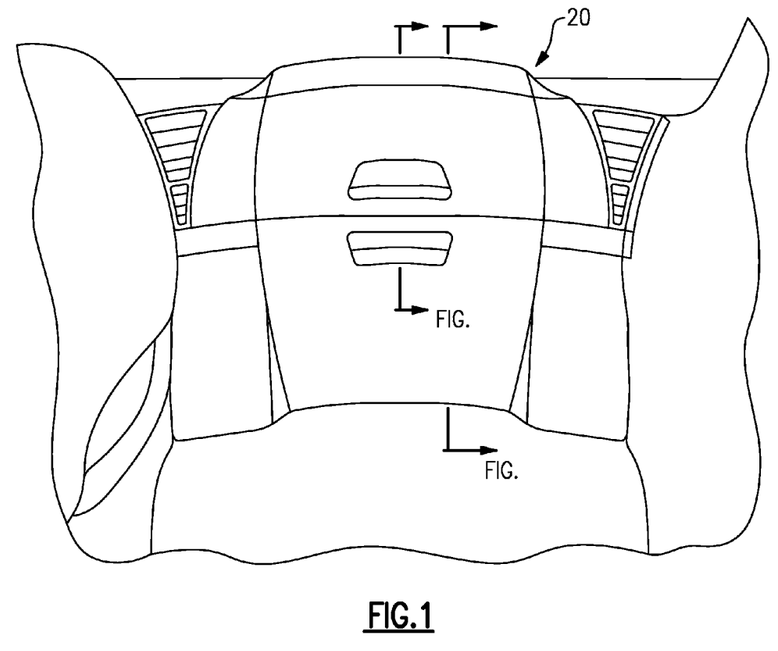
FIG. 1 illustrates an example glove compartment.

FIG. 1 illustrates an example glove compartment 20 for a vehicle (not shown). The vehicle is not particularly limited and can be, for example only, an automobile. Typically, the glove compartment 20 will be mounted in front of the passenger seat of the vehicle. In this regard, the side or portion of the glove compartment 20 that faces toward the passenger seat is the front of the glove compartment 20 for purposes of this description, while the side or portion of the glove compartment 20 opposite the passenger seat is the back or rear of the glove compartment 20. In FIG. 1, the front of the glove compartment 20 is shown, from the perspective of the passenger seat.

Figure 2:
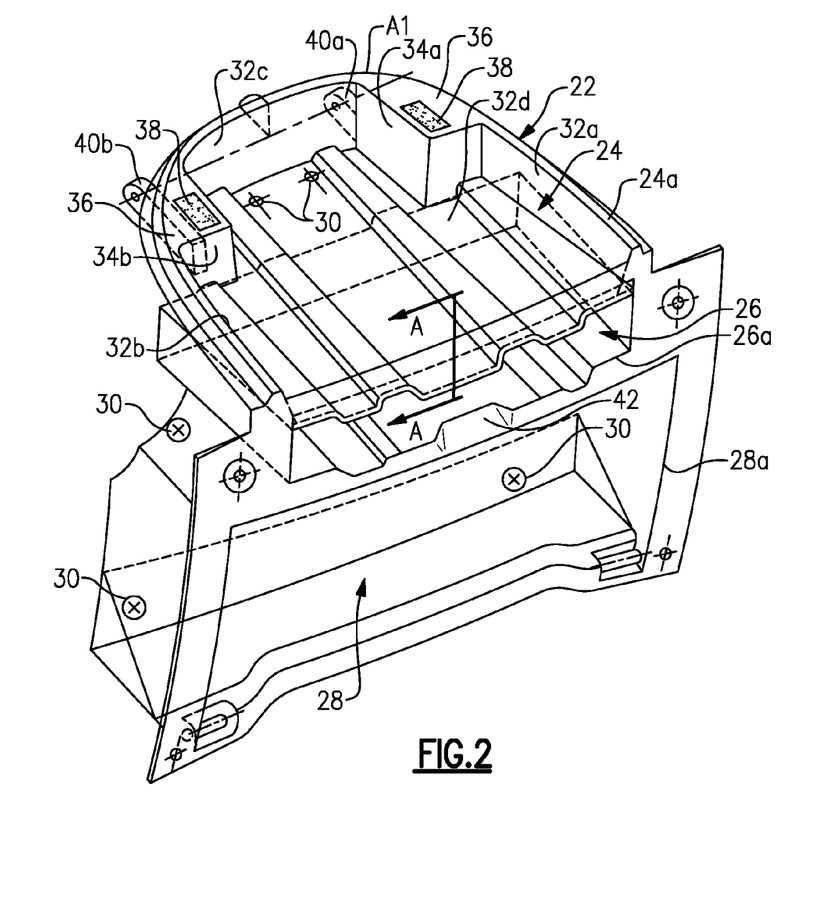
FIG. 2 illustrates an example unitary carrier of the glove compartment of FIG. 1.

The glove compartment 20 is a modular assembly that can be assembled at a single station on a vehicle assembly line. As shown in FIG. 2, the glove compartment includes a carrier 22. The carrier 22 is unitarily formed (i.e., one-piece) of a polymeric material. The polymeric material is not limited, but can be selected to meet the mechanical design requirements of the carrier 22. Example polymeric materials can include polyamide, polyolefin, and polycarbonate, any of which be fiber-reinforced or include other reinforcing fillers.

The carrier 22 includes a distinct upper compartment 24, a distinct intermediate compartment 26, and a distinct lower compartment 28. The upper compartment 24 has an upper compartment mouth 24a that generally faces upwards and is slanted toward the passenger seat of the vehicle. Likewise, the intermediate compartment 26 has an intermediate compartment mouth 26a and the lower compartment 28 has a lower compartment mouth 28a. The mouths 26a and 28a face forward toward the passenger seat.

The carrier 22 can be provided with one or more carrier mounts 30 for securing the carrier 22 as a module within the vehicle. As can be appreciated, the location and type of the mounts 30 can be varied according to particular design requirements. For example, the mounts 30 can include bosses that are molded with the carrier 22, openings for receiving fasteners, or both.

Figure 3:
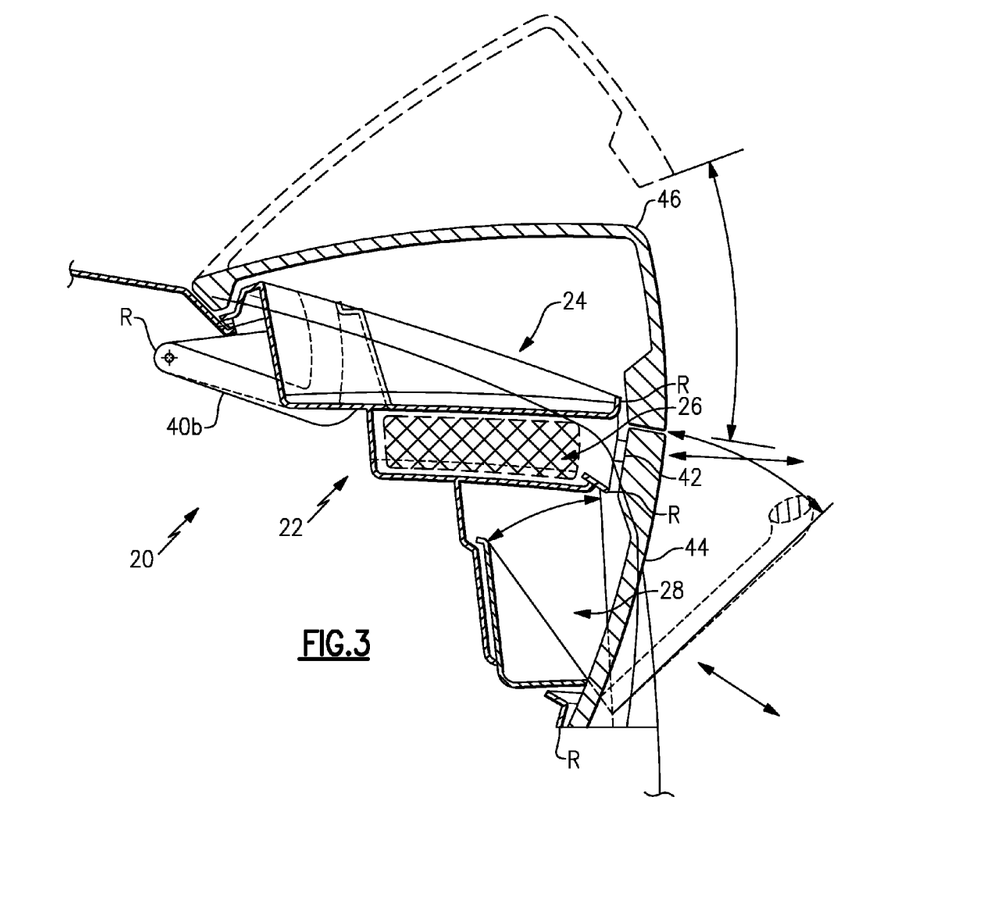
FIG. 3 illustrates a cross-section of the glove compartment of FIG. 1.

Referring also to FIG. 3, the upper compartment 24 is defined by lateral side walls 32a and 32b, a back wall 32c, and a bottom wall 32d. In this example, projections 34a and 34b protrude into the upper compartment 24 from the respective lateral side walls 32a and 32b. Each of the projections 34a and 34b includes a corresponding top surface 36 through which there are corresponding openings 38 in the carrier 22.

The back or rear of the carrier 22 includes first and second hinge mounts 40a and 40b. The hinge mounts 40a and 40b define a hinge axis A1. In this example, the hinge axis A1 is displaced behind the upper compartment 24 and is also vertically aligned with the upper compartment 24. That is, the hinge axis A1 is vertically between the upper and lower surfaces of the upper compartment 24.

Optionally, the carrier 22 can also includes a flexible retainer 42 located at the intermediate compartment mouth 26a. For example, the flexible retainer 42 can include a molded-in flexible tab that can function to retain objects within the intermediate compartment 26.

As shown in FIG. 3, the glove compartment 20 also includes a first door 44 and a second door 46 that are each mounted on the carrier 22. The first door 44 is movable between open and closed positions with respect to the lower compartment 28 and the intermediate compartment 26. In FIG. 3, the first door 44 is shown in a fully closed position, and the open position in shown in phantom. The second door 46 is movable between open and closed positions with respect to the upper compartment 24. Likewise, the second door 46 is shown in a fully closed position, while the open position is shown in phantom.

Figure 4:
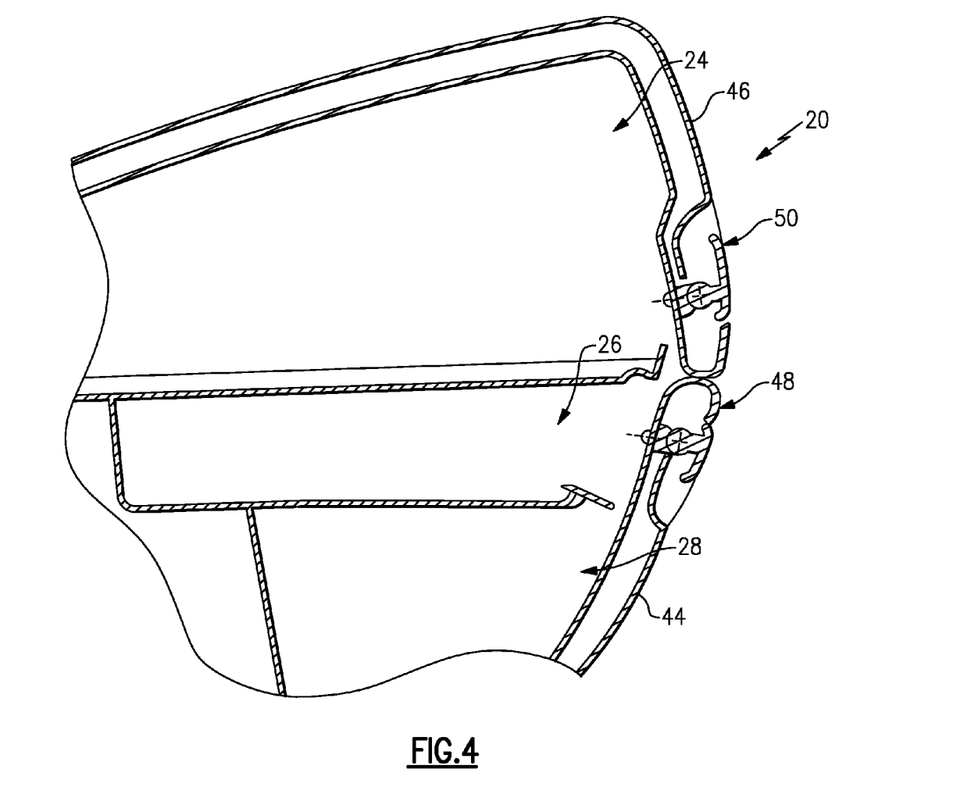
FIG. 4 illustrates a cross-section of a portion of a glove compartment of FIG. 1.

FIG. 4 illustrates selected portions of the doors 44 and 46 in the fully closed positions. In this example, the doors 44 and 46 include respective latches 48 and 50 that are operable to retain the doors 44 and 46 in the closed positions. Optionally, the latches 48 and 50 can be locked in the closed positions.

Figure 5:
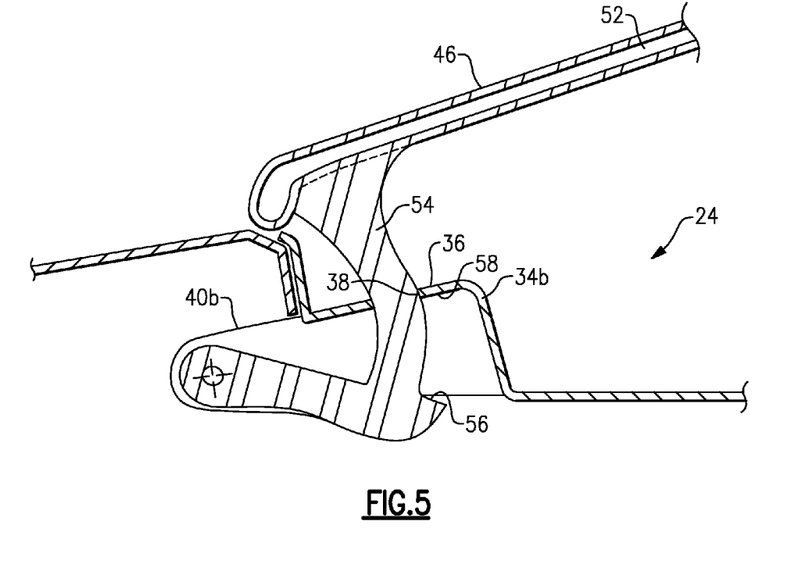
FIG. 5 illustrates a portion of a door and hinge of the glove compartment of FIG. 1.

FIG. 5 shows a selected portion of the second door 46 and upper compartment 24. The second door 46 includes a door panel 52 and first and second hinge arms 54 (one shown) that extend outwardly from the door panel 52. The hinge arms 54 connects, respectively, to the hinge mounts 40a and 40b such that the second door 46 is pivotable about axis A1. The hinge arms 54 are received through the openings 38 in the projections 34 and 34b. Thus, the hinge arms 54 extend partially through the upper compartment 24 and then to the exterior of the upper compartment 24 to connect with the hinge mounts 40a and 40b. The projections 34a and 34b thus form a negative, open area beneath the upper compartment 24 to accommodate a portion of the hinge arms 54 and contribute to the compact design of the glove compartment 20.

Each of the hinge arms 54 includes an upwardly facing stop surface 56 that can contact a corresponding stop surface 58 on an exterior underside of the upper compartment 24. When the second door 46 is moved from a closed position toward the fully open position, the stop surface 56 abuts the stop surface 58 to thereby limit further movement of the second door 46. Thus, the stop surfaces 56 and 58 establish the fully open position of the second door 46.

Figure 6A:
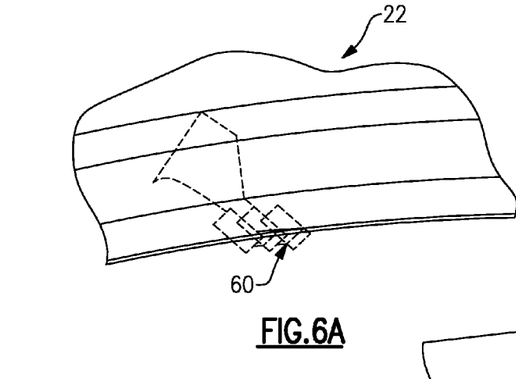
FIGS. 6A and 6B illustrate location ribs of a carrier of a glove compartment.
Figure 6B:
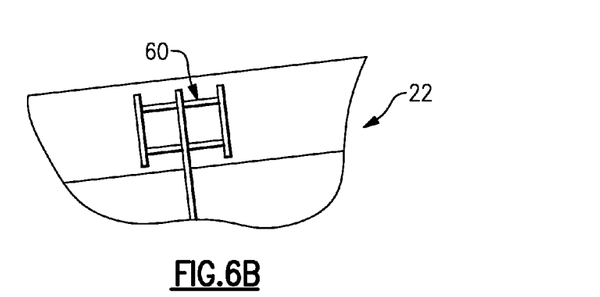
Figures 7, 8:
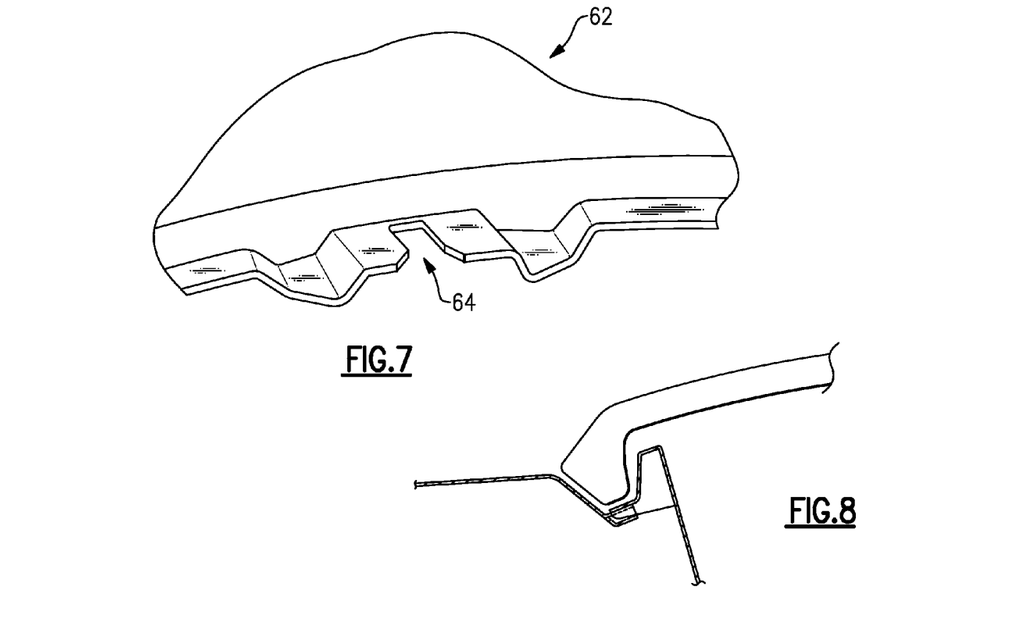
FIG. 7 illustrates a location feature of a topper panel that is interconnectable with the location ribs shown if FIGS. 6A and 6B.
FIG. 8 illustrates an interconnection between a topper panel and a carrier having location ribs.

Referring to FIGS. 6A and 6B, the carrier 22 optionally can also optionally include location ribs 60 that are configured to locate an instrument panel topper with respect to the carrier 22. For example, a portion of an instrument panel topper 62 is shown in FIG. 7 and includes a corresponding locating feature 64 that is interconnectable with the location ribs 60 of the carrier 22. Thus, the location feature 64 of the panel topper 62 cooperates with the location ribs 60 of the carrier 22 to properly position the instrument panel topper 62 with respect to the carrier 22, as shown in FIG. 8.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A glove compartment for a vehicle, comprising:
    a carrier unitarily formed of a polymeric material, the carrier including a distinct upper compartment, a distinct lower compartment, and a distinct intermediate compartment between the distinct upper compartment and the distinct lower compartment;
    a first door mounted on the carrier and moveable between open and closed positions with respect to the distinct lower compartment and the distinct intermediate compartment; and
    a second door mounted on the carrier and moveable between open and closed positions with respect to the distinct upper compartment.

2. The love compartment as recited in claim 1, wherein the first door and the second door open in opposed directions.

3. The glove compartment as recited in claim 1, wherein the carrier includes location ribs configured to locate an instrument panel topper with respect to the carrier.

4. The glove compartment as recited in claim 1, wherein the distinct intermediate compartment opens at an intermediate compartment mouth, and the carrier includes a flexible retainer at the intermediate compartment mouth.

5. The glove compartment as recited in claim 1, wherein the carrier includes opposed first and second openings and corresponding opposed first and second hinge mounts situated outside of the distinct upper compartment adjacent the first and second openings.

6. The glove compartment as recited in claim 5, wherein the second door includes a door panel and opposed first and second hinge arms that extend outwards from the door panel, the first and second hinge arms being received, respectively, through the first and second openings and pivotably supported on, respectively, the first and second hinge mounts.

7. The glove compartment as recited in claim 1, wherein the carrier includes a front face, the distinct intermediate compartment opening at an intermediate compartment mouth at the front face and the distinct lower compartment opening at a lower compartment mouth at the front face.

8. The glove compartment as recited in claim 7, wherein the front face includes forwardly-facing bumpers that contact the first door in a fully closed position.

9. A glove compartment for a vehicle, comprising:
    a carrier including a distinct upper compartment, a distinct lower compartment, and a distinct intermediate compartment between the distinct upper compartment and the distinct lower compartment, the carrier including opposed first and second openings through the distinct upper compartment and corresponding opposed first and second hinge mounts situated outside of the distinct upper compartment adjacent the first and second openings;
    a first door mounted on the carrier and moveable between open and closed positions with respect to the distinct lower compartment and the distinct intermediate compartment; and
    a second door mounted on the carrier and moveable between open and closed positions with respect to the distinct upper compartment, the second door including a door panel and opposed first and second hinge arms that extend outwards from the door panel, the first and second hinge arms being received, respectively, through the first and second openings and pivotably supported on, respectively, the first and second hinge mounts.

10. The glove compartment as recited in claim 9, wherein at least one of the first and second hinge arms includes an upwardly facing stop surface that contacts a corresponding stop surface on an exterior underside of the distinct upper compartment to define a fully open position of the second door.

11. The glove compartment as recited in claim 9, wherein the first and second hinge mounts define a hinge axis that is displaced behind the distinct upper compartment.

12. The glove compartment as recited in claim 11, wherein the hinge axis is vertically aligned with the distinct upper compartment.

13. The glove compartment as recited in claim 9, wherein the distinct upper compartment extends between lateral sides, and the carrier includes opposed first and second projections that protrude into the distinct upper compartment from, respectively, the lateral sides, the first and second openings extending through, respectively, the first and second projections.

14. The glove compartment as recited in claim 13, wherein the first and second projections each include respective first and second upwardly-facing surfaces, and the first and second openings extend through the first and second upwardly-facing surfaces.

15. The glove compartment as recited in claim 9, wherein the first door and the second door open in opposed directions.

16. The glove compartment as recited in claim 9, wherein the carrier includes location ribs configured to locate an instrument panel topper with respect to the carrier.

17. The glove compartment as recited in claim 9, wherein the distinct intermediate compartment opens at an intermediate compartment mouth, and the carrier includes a flexible retainer at the intermediate compartment mouth.

\* \* \* \* \*

UNITED STATES PATENT AND TRADEMARK OFFICE
CERTIFICATE OF CORRECTION

| | | |
|---|---|---|
| PATENT NO. | : 9,045,089 B1 | Page 1 of 1 |
| APPLICATION NO. | : 14/278619 | |
| DATED | : June 2, 2015 | |
| INVENTOR(S) | : Jeffrey Michael Bisson | |

It is certified that error appears in the above-identified patent and that said Letters Patent is hereby corrected as shown below:

IN THE CLAIMS:

In claim 2, column 3, line 59; delete "love" and replace with --glove--

Signed and Sealed this
Tenth Day of November, 2015

Michelle K. Lee
*Director of the United States Patent and Trademark Office*